Patented Mar. 14, 1950

2,500,231

UNITED STATES PATENT OFFICE 2,500,231

ENAMEL OPACIFIER AND METHOD OF MAKING

William J. Baldwin, Snyder, N. Y., assignor, by mesne assignments, to National Lead Company, New York, N. Y., a corporation of New Jersey No Drawing. Application November 20, 1945, Serial No. 629,912

3 Claims. (Cl. 106—312)

The present invention relates to an opacifier for use in vitreous enamels and particularly to a mill addition opacifier for use with zirconium opacified enamel frits which develop opacity on heating in the enameling cycle.

In the enameling of metal and particularly sheet iron and steel, the ultimate object is to obtain a vitreous coating upon the metal base which presents a high degree of opacity as this is an esthetic requirement in enameling, as great a coverage as possible and a finished vitreous coating resistant to strains and impact incident to assembly, storage, transportation or use.

A very important feature of a finished enamel article and, therefore, of the enamel to be applied to the article, is the diffuse reflectance or opacity of the enamel coating. In general, the opacity may be obtained by adding materials to the glass composing the frit as, for instance, certain compounds of fluorine or antimony, to mention but two of the more popular older types, or zircon as a more recent opacifier. Or, opacifiers may be added to the frit subsequent to its manufacture and milled therewith as a separate individual ingredient, so-called mill addition opacifiers.

Vitreous enamel coatings of exceptional properties have been produced in recent years which depend for their opacity upon the presence of compounds of zirconium in the frit. Patents Nos. 1,944,938 of January 30, 1934, to C. J. Kinzie and 2,326,348 of August 10, 1943, to Frost and Commons relate to enameling or glazing frit compositions depending upon zircon type opacifiers to obtain relatively high reflectance values; additional phases of this important field are described in patents to Bahnsen et al. Nos. 2,250,456 and 2,250,457 of July 29, 1941, and 2,324,812 of July 20, 1943. Enamels of this type develop opacity in the enameling cycle, in contrast with enamels of other types wherein the opacity is developed in the manufacture of the frit.

In general, the greater the amount of an opacifier in a fruit the higher the opacity of the finished enamel; however, it is known that, at times, surface difficulties in the enamel may be caused by attempts to include too great an amount of an opacifier in the frit glass. These surface difficulties decrease the esthetic value of the enamel coating and, therefore, in effect, defeat one of the purposes of the addition of the opacifier.

In accordance with the present invention the opacity of zirconium-opacified enamels of the type which develop opacity on heating in the enameling cycle is increased by the employment of specially prepared opacifiers containing zirconium oxide, phosphorus pentoxide and aluminum oxide as a mill addition whereby the reflectance value of the finished enamel is increased to an exceptional degree.

In accordance with the present invention, the special mill addition opacifier may be prepared by suitably combining materials containing zirconium oxide, aluminum oxide and phosphorus pentoxide or combining the oxides themselves. A mixture of suitable raw material containing the above oxides, or of the oxides themselves, is calcined above about 1600° F. and generally in the neighborhood of 2000° F. or at such other temperature at which ceramic combination of the compounds occurs to produce a relatively homogeneous sinter. After calcining, the resultant product is ground to appropriate fineness, that is, on the order of ½ to 1 micron, preferably toward the lower limit of this range. Products so prepared, when used to the extent of about 2 to 4% as a mill addition to a commercial zirconium opacified frit, increased the reflectance values as compared to values obtained without the presence of such mill addition material or as compared with the usual zirconium oxide mill addition. In general, the composition of the mill addition opacifier of the present invention comprises the ternary system of phosphorus pentoxide, aluminum oxide and zirconium oxide, the zirconium oxide varying from about 10 to about 40%, the aluminum oxide ranging from about 25 to 65%, and phosphorus pentoxide ranging from 25 to 45%, of the finished mill addition opacifier.

Instead of employing the pure oxides, good results are obtained by employing the accepted raw materials used in the manufacture of enamel frits, that is to say, amblygonite, aluminum metaphosphate, ammonium acid phosphate, aluminum hydrate, and various usual sources of zirconium oxide, aluminum oxide and phosphorus pentoxide.

Composition 1.—Opacifier

As a specific example merely illustrative of the invention but not limitative thereof a raw batch was made up of the following ingredients:

| | Parts by weight |
|---|---|
| Amblygonite | 53.5 |
| Aluminum hydrate | 54.5 |
| Zirconium oxide | 22.4 | which corresponded to an oxide formula of:

| | Per cent |
|---|---|
| $P_2O_5$ | 25.0 |
| $Al_2O_3$ | 53.5 |
| $ZrO_2$ | 21.5 | or an approximate molecular formula of $$ZrO_2.P_2O_5.3Al_2O_3$$

(disregarding ingredients which are not significant).

The raw batch was ground together and heated to 2000° F. and after the calcination was ground to a powder having a particle size of about  micron. 2% of the finely ground and so prepared mill addition opacifier was added to the mill and ground with a standard zirconium opacified frit of the type which produces opacity in the enameling cycle and having an oxide formula of the approximate composition as follows:

*Composition 2.—Frit*

[Ingredients in per cent]

| | |
|---|---|
| $SiO_2$ | 30 |
| $ZrO_2$ | 14 |
| $TiO_2$ | 0.1 |
| $Al_2O_3$ | 9 |
| $ZnO$ | 3 |
| $CaO$ | 8 |
| $P_2O_5$ | 2.5 |
| $B_2O_3$ | 18 |
| $F$ | 5 |
| $K_2O$ | 2 |
| $Na_2O$ | 13 |

Minor miscl. ingredients are additional.

The oxides shown in this table being calculated according to conventional practice and the fluorides being indicated by their content of fluorine, the total of the percentages indicated exceeds 100.

The milled zirconium opacified frit, Composition 2, and special mill addition opacifier of Composition 1 produced an enameled article having a considerably greater reflectance than an enamel prepared solely from Composition 2 at the same application weight as shown in the following table:

*Relative reflectances*

| Application Weight Grams/Sq. Ft. Dry | Reflectance of Zr Opacified Enamel, No Mill Addition | Reflectance of Resultant Enamel Containing 2% of Opacifier of Composition 1 |
|---|---|---|
| 30 | 64.6 | 67.6 |
| 40 | 70.6 | 73.6 |
| 50 | 74.0 | 76.8 |

The employment of the special opacifier of the present invention possesses advantages over the usual zirconium oxide mill addition opacifier employed heretofore with zirconium opacified frits.

| Application Weight, Grams/Sq. Ft. Dry | Reflectance of Enamel No Mill Addition Opacifier | Reflectance of Zr Opacified Frit, 2% $ZrO_2$ Mill Addition |
|---|---|---|
| 30 | 64.0 | 64.0 |
| 40 | 70.6 | 70.8 |
| 50 | 74.0 | 74.8 |

Tests were made upon various other commercial zirconium opacified enamels and in every instance increase in reflectance was obtained by the employment of the composition of the instant invention as a mill addition opacifier.

By way of illustration, the compositions of the commercial zirconium opacified frits to which the mill addition of the present invention may be added with advantage may vary as follows:

| | Per cent |
|---|---|
| $SiO_2$ | 25–40 |
| $Al_2O_3$ | 7–16 |
| $B_2O_3$ | 10–20 |
| $KNaO$ | 10–16 |
| $CaO$ | 3–7 |
| $F_2$ | 5–10 |
| $ZrO_2$ | 10–15 |
| $ZnO$ | 2–14 |
| $P_2O_5$ | 0.5–3 |
| $TiO_2$ | 0–2 |

Although the preferred composition of the special mill addition opacifier of the present invention is represented by the approximate formula $ZrO_2.P_2O_5.3Al_2O_3$, the various ingredients may be varied from such formula within the range 10% to 40% $ZrO_2$, 25% to 35% $P_2O_5$ and 25% to 65% $Al_2O_3$. Where the composition is without these limits the increase in opacity falls off rapidly probably by reason of increased solubility of the opacifier composition in the frit when heated. It will be understood that the usual amounts of electrolyte, clay and the like are added at the mill in the usual manner.

What is claimed is:

1. A sintered composition suitable for use as a mill addition opacifier for enamel frits of the zirconium opacified type which develop opacity in heating which comprises in ceramic combination 10 to 40% zirconium oxide, 25 to 65% aluminum oxide and 25 to 45% phosphorus pentoxide.

2. The method of preparing an opacifier which is suitable as a mill addition for enamels which consists in calcining at a temperature of approximately 2000° F. a mixture consisting by weight of about 53.5 parts of amblygonite, 54.5 parts of aluminum hydrate and about 22.4 parts of zirconium oxide, and grinding the calcined material to a finely divided state.

3. A mill addition opacifier which is suitable for enamels of the type developing opacity during the enameling cycle, consisting of the calcined product of a mixture having a composition corresponding substantially to the approximate molecular formula $ZrO_2.P_2O_5.3Al_2O_3$, said formula disregarding non-significant ingredients.

WILLIAM J. BALDWIN.

REFERENCES CITED

The following references are of record in the file of this patent:

UNITED STATES PATENTS

| Number | Name | Date |
|---|---|---|
| 1,314,831 | Preusser | Sept. 20, 1919 |
| 2,252,588 | Whitesell | Aug. 12, 1941 |
| 2,347,187 | Frost | Apr. 25, 1944 |